(12) United States Patent
Dunlap et al.

(10) Patent No.: US 6,367,360 B1
(45) Date of Patent: Apr. 9, 2002

(54) APPARATUS FOR TRIMMING PLASTIC BLOW MOLDINGS

(75) Inventors: Richard L. Dunlap, Cairo; Edward L. Sanford, Lima; David M. Amirault, Troy, all of OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

(21) Appl. No.: 09/460,033

(22) Filed: Dec. 13, 1999

(51) Int. Cl.[7] ............................ B23B 5/12; B23B 25/00; B23B 27/08; B26D 7/18
(52) U.S. Cl. ............................ 82/131; 82/113; 83/100; 83/914; 425/289; 425/316; 425/806
(58) Field of Search ............................ 82/130, 131, 113; 425/292, 302.1, 316, 327, 531, 289, 806; 83/54, 192, 193, 194, 182, 184, 914, 282, 167, 100, 452, 563, 564

(56) References Cited

U.S. PATENT DOCUMENTS

| | | | | |
|---|---|---|---|---|
| RE20,974 E | * | 1/1939 | Guirl et al. | 82/130 |
| 2,978,745 A | * | 4/1961 | Langecker | 425/531 X |
| 3,128,658 A | * | 4/1964 | Mitchell et al. | 82/130 |
| 3,630,105 A | * | 12/1971 | Rider | 82/130 X |
| 4,433,598 A | * | 2/1984 | Murray | 82/131 |
| 4,538,489 A | * | 9/1985 | Takano | 425/527 X |
| 5,167,968 A | | 12/1992 | Dunlap et al. | |
| 5,207,136 A | * | 5/1993 | Evard et al. | 82/130 |
| 5,664,471 A | * | 9/1997 | Dundas | 83/914 X |
| 5,682,804 A | * | 11/1997 | Moore | 83/914 X |
| 5,749,275 A | * | 5/1998 | Dundas et al. | 83/914 X |
| 5,916,343 A | * | 6/1999 | Huang et al. | 82/113 X |
| 6,055,893 A | * | 5/2000 | Piguet et al. | 82/130 |
| 6,189,425 B1 | * | 2/2001 | Ricci et al. | 82/113 |

* cited by examiner

*Primary Examiner*—M. Rachuba
*Assistant Examiner*—Charles Goodman
(74) *Attorney, Agent, or Firm*—Brooks & Kushman P.C.

(57) ABSTRACT

Apparatus (10) for trimming a blow molding (12) includes a rotary trimming assembly (16) rotatively mounted and driven on a trimmer head (14). The trimming assembly (16) includes a tube (18) of a rotary member (46) aligned with the blow molding such that operation of an actuating mechanism (20) provides cam actuated movement of a knife holder (48) to perform the trimming which allows the trimmed off blow molding portion to move through the tube (18) away from the trimmed blow molding in preparation for the next trimming cycle. A vacuum source (36) draws a vacuum within a conduit (34) connected to the tube (18) to provide the movement of the trimmed off blow molding portion away from the trimmer head.

11 Claims, 5 Drawing Sheets

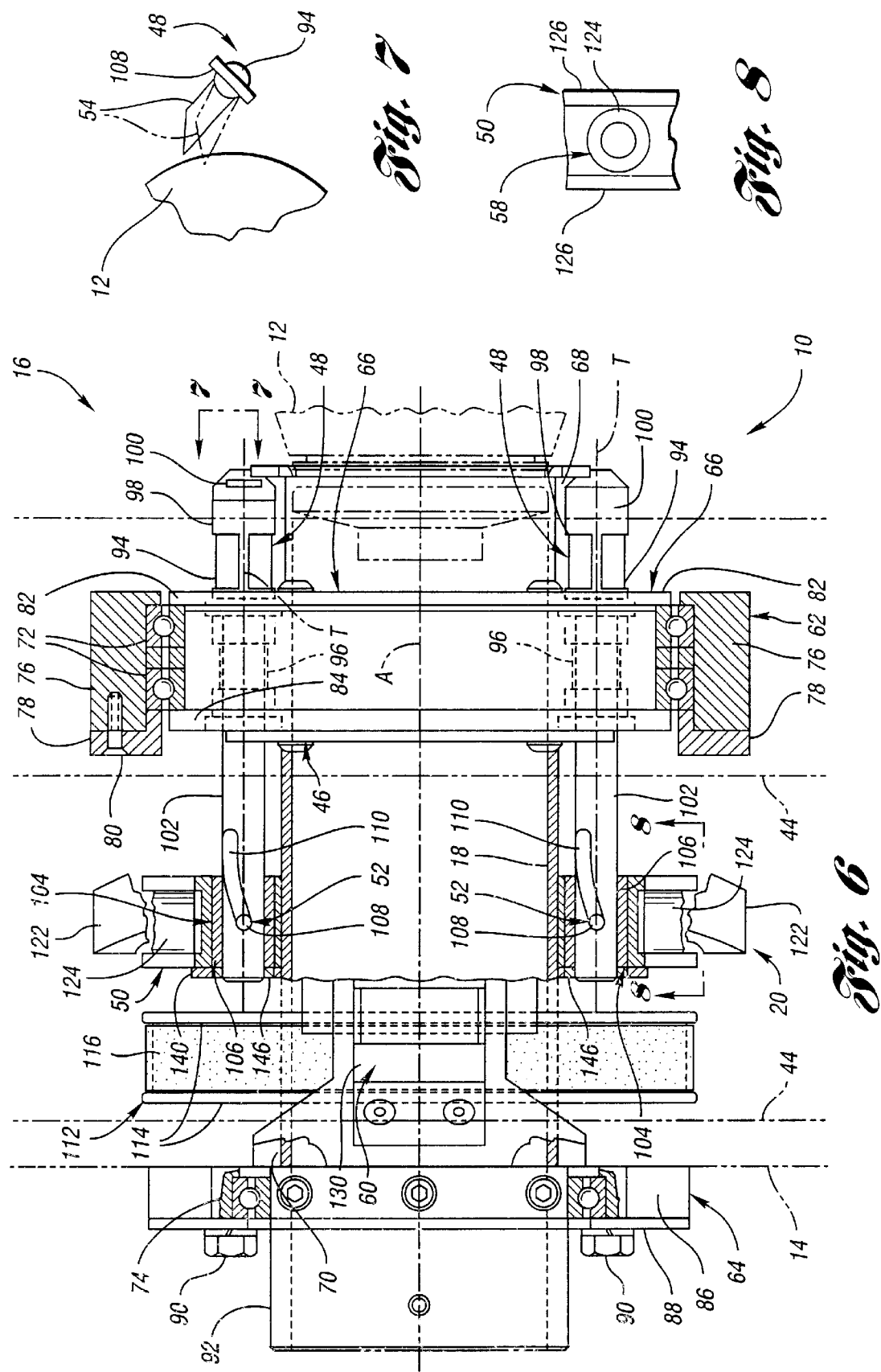

ism that
APPARATUS FOR TRIMMING PLASTIC BLOW MOLDINGS

TECHNICAL FIELD

This invention relates to apparatus for trimming a plastic blow molding.

BACKGROUND ART

Plastic blow moldings conventionally utilized to provide containers for liquids or other contents are manufactured in one process by extruding a hollow tubular parison of hot plastic between open portions of a mold which is then closed prior to introducing air into the interior of the parison. The pressurized air blows the parison outwardly to the shape of an enclosed cavity defined by the closed mold portions so as to thereby provide a blow molding that can be removed after opening of the mold. Excess plastic referred to a flash is conventionally removed by a reciprocally removable knife in a guillotine fashion to further process the blow molding. At a dispensing neck of the blow molding for providing the container, further finish is usually required and is conventionally performed by a rotary reamer which produces plastic particles some of which can be received within the interior of the blow molding. These plastic particles must be removed prior to completion of the blow molded article which is usually performed by turning the blow molding upside down and blowing air into it so that the cooperation of gravity and the blowing air cleans the interior of the blow molding. These reaming and plastic particle removal operations add to the cost of the completed blow molded articles and thus must be borne by the ultimate consumer.

U.S. Pat. No. 5,167,968 discloses a finishing machine for trimming a blow molding by a rotary knife so as to thereby eliminate the problem involved with reaming as far as generating particles that are received within the blow molding so as to require removal. The cutting performed involves a mechanism that extends along the rotational axis into a cup member that receives the portion of the blow molding that is cut off during the trimming operation. A plunger that moves along the central axis ejects the trimmed portion from the cup member adjacent the location of cutting in preparation for the next cycle.

DISCLOSURE OF INVENTION

An object of the present invention is to provide improved apparatus for trimming a plastic blow molding and for facilitating removal of the trimmed off portion of the blow molding.

In carrying out the above object, apparatus for trimming a blow molding in accordance with the invention includes a trimmer head adjacent which is positioned the blow molding to be trimmed. A rotary trimming assembly of the apparatus has a generally annular shape and includes a rotary member rotatably supported by the trimmer head and rotatably driven about a central axis. The rotary member is axially fixed along the central axis with respect to the trimmer head and includes a tube through which the central axis extends with the tube generally in alignment with the blow molding to be trimmed. The rotary trimming assembly also includes a knife holder pivotally mounted on the rotary member for rotation therewith and being pivotally movable with respect thereto about a trimming axis that extends parallel to the central axis in a spaced relationship thereto. The rotary trimming assembly also includes an annular cam follower that is movable along the central axis with respect to the rotary member thereof that mounts the knife holder. The rotary trimming assembly further includes a cam mechanism that extends between the annular cam follower and the knife holder to pivot the knife holder upon movement of the annular cam follower along the central axis with respect to the rotary member such that a knife held by the knife holder trims a portion of the blow molding from the rest of the blow molding. An actuating mechanism of the apparatus includes a cam that is mounted by the trimmer head and that engages the annular cam follower of the rotary trimming assembly during rotary driving thereof about the central axis. The actuating mechanism includes an actuator that moves the cam thereof to move the annular cam follower of the rotary trimming assembly and pivot the knife holder such that the knife held thereby trims the portion of the blow molding to allow the trimmed blow molding portion to move through the tube away from the trimmed blow molding in preparation for the next trimming cycle.

The construction and operation of the apparatus thus not only provides for convenient trimming of the blow molding but also facilitates removal of the trimmed blow molding portion for movement away from the location of trimming such that the apparatus can be conveniently prepared for the next trimming cycle.

In the preferred construction of the apparatus, an operator moves the trimmer head toward the blow molding for the trimming operation and back away from the trimmed blow molding in preparation for the next cycle.

The apparatus also includes a conduit connected to the tube of the rotary trimming assembly and further includes a vacuum source for drawing a vacuum in the conduit to move the trimmed blow molding portion through the conduit away from the trimmer head in preparation for the next trimming cycle. The vacuum source is preferably a blower having an output. A Y coupling of the apparatus has a venturi and is connected to the conduit and to the output of the blower to draw the vacuum that moves the trimmed blow molding portion through the conduit away from the trimmer head.

The head includes first and second mounting blocks. The rotary member of the rotary trimming assembly includes a ring portion rotatably supported by the first mounting block of the trimmer head, and the tube of the rotary member of the rotary trimming assembly has one end that projects from the ring portion of the rotary member toward the blow molding to be trimmed, and the tube has another end rotatably supported by the second mounting block. Antifriction bearings rotatably support the ring portion and the tube of the rotary member on the first and second mounting blocks.

The apparatus also has the tube of the rotary member slidably supporting the annular cam follower at a location between the first and second mounting blocks for movement along the central axis under the impetus of the cam of the actuating mechanism to perform the trimming operation. The knife holder preferably has an elongated shaft that extends along the trimming axis and has an intermediate portion that is pivotally supported on the ring portion of the rotary member. The elongated shaft of the knife holder has a first end that projects from the ring portion of the rotary member toward the blow molding to be trimmed and includes a knife portion holder that holds the knife for trimming the blow molding. The elongated shaft of the knife holder also has a second end that projects from the ring portion of the rotary member toward the annular cam follower and has slide connections therewith where the cam mechanism of the rotary trimming assembly pivots the elongated shaft of the knife holder upon movement of the annular cam follower under the impetus of the actuating mechanism. A pair of guideways extend from the ring portion of the rotary member of the trimming assembly and have slide connections that support the annular cam follower of the rotary trimming assembly for movement along the central axis. A support plate is connected to the pair of guideways and has a bushing for rotatably supporting the second end of the knife holder shaft. The cam mechanism of the rotary trimming assembly includes a cam pin supported by the annular cam follower and also includes a cam follower slot that receives the cam pin and is located in the second end of the elongated shaft of the knife holder.

In its preferred construction, the apparatus includes a driven member mounted on the tube of the rotary member to provide rotary driving thereof for the trimming operation. This driven member is most preferably a belt pulley mounted on the tube of the rotary member at a location between the annular cam follower of the rotary trimming assembly and the second mounting block that rotatably mounts the tube on the trimmer head.

The preferred construction of the actuating mechanism of the apparatus includes a fork pivotally mounted on the trimmer head. This fork includes a pair of arms having distal ends between which is located the annular cam follower of the trimming assembly. The cam of the actuating mechanism includes a pair of cam rollers that are respectively rotatably supported on the distal ends of the pair of arms of the fork. The annular cam follower of the trimming assembly has a pair of annular flanges that are spaced along the central axis to receive the pair of cam rollers therebetween, and the fork of the actuating mechanism includes a leg that is moved by the actuator to move the cam rollers and the annular cam follower of the rotary trimming assembly to pivot the knife holder and perform the trimming operation.

The objects, features and advantages of the present invention are readily apparent from the following detailed description of the best mode for carrying out the invention when taken in connection with the accompanying drawings.

BRIEF DESCRIPTION OF DRAWINGS

FIG. 6 is a view similar to FIG. 4 but partially broken away to further illustrate the construction of the rotary trimming assembly.

FIG. 7 is a view taken along the direction of line 7—7 in FIG. 6 to further illustrate the construction of the knife holder and the knife held thereby for performing the trimming operation.

FIG. 8 is a partial view taken along the direction of line 8—8 in FIG. 6 to further illustrate the construction of roller cams and flanges of an annular cam follower of the rotary trimming assembly of the apparatus.

BEST MODE FOR CARRYING OUT THE INVENTION

Figure 1:
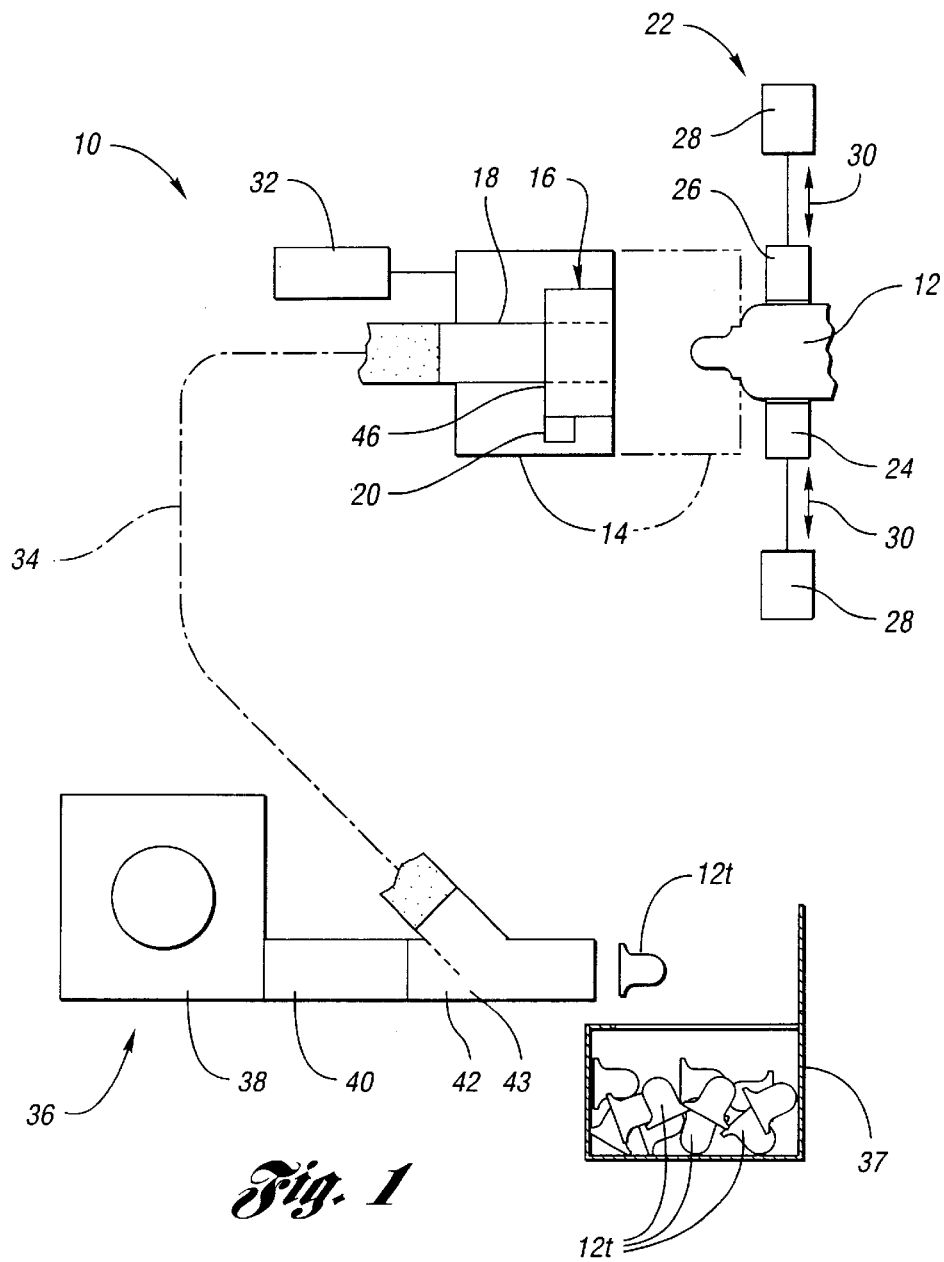
FIG. 1 is a schematic view illustrating apparatus of the present invention for trimming a plastic blow molding.
Figure 2:
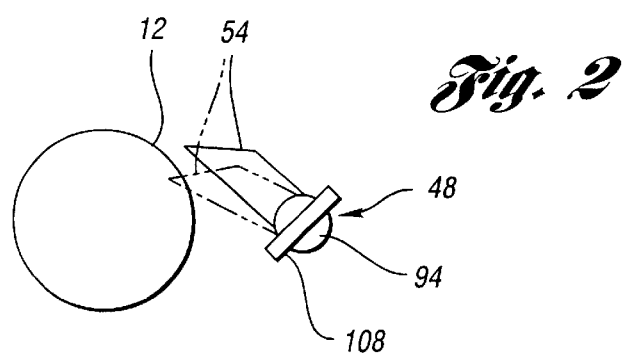
FIG. 2 is a schematic view that illustrates a knife holder and knife for performing the trimming operation.

With reference to FIG. 1 of the drawings, apparatus constructed in accordance with the present invention is generally indicated by 10 and is operably to provide trimming of a plastic blow molding identified by 12. The apparatus as is hereinafter more fully described includes a trimmer head 14 adjacent the blow molding 12, a rotary trimming assembly 16 that includes a tube 18 generally in alignment with the blow molding 12 to be trimmed, and an actuating mechanism 20 that actuates the trimming operation of the blow molding 12.

As illustrated in FIG. 1, the blow molding 12 is positioned by a clamp mechanism 22 that includes lower and upper clamp members 24 and 26 that are moved by associated clamp actuators 28 in the opposite directions shown by arrows 30 to provide clamping and unclamping of the blow molding in preparation for the trimming operation. An operator 32 of the apparatus is preferably a compressed air or hydraulically operated cylinder and is operable to move the trimmer head 14 from the solid line indicated position to the phantom line indicated position to perform the trimming operation as is hereinafter more fully described. However, it should be appreciated that different ways can likewise be utilized to perform the trimming such as moving the blow molding on a conveyor that provides lateral movement thereof toward and away from the trimmer head which can remain stationary. Likewise, other ways of clamping and unclamping the blow molding can also be utilized regardless of whether the trimmer head is stationary or movable.

With continuing reference to FIG. 1, the apparatus 10 includes a schematically indicated conduit 34 that may be a hose or other passage connected to the tube 18 of the rotary trimming assembly. A vacuum source 36 of the apparatus draws a vacuum in the conduit 34 and the tube 18 so that the trimmed off portion 12t of the blow molding is drawn by the vacuum through the tube 18 and the conduit 34 away from the location of the cutting and is moved to a scrap bin 37 or to a scrap conveyor for eventual recycling. As illustrated, the trimmed off portion 12t is a blow head of the blow molding 12 which is manufactured by extruded blow molding from a hot parison with the blow head being the location at which a blow pin is inserted into the hot parison to blow the blow molding to the shape of a closed mold cavity prior to opening of the cavity and removal of the blow molding. In the preferred construction illustrated, the vacuum source 36 includes a blower 38 having an output 40 connected to a Y coupling 42 having a venturi 43 for drawing a vacuum. The Y coupling 42 is also connected to the conduit 34 to draw the vacuum that moves the trimmed blow molded portion 12t through the tube 18 and the conduit away from the trimmer head 14 in preparation for the next trimming cycle.

With reference to FIGS. 3–6, the trimmer head 14 is fabricated from various plates and members 44 that are bolted to each other to provide structure for rotatably supporting the rotary trimming assembly 16 as is hereinafter more fully described. This rotary trimming assembly has a generally annular shape and includes a rotary member 46 that is rotatably supported by the trimmer head and rotatably driven about a central axis A. The rotary member 46 is axially fixed along the central axis A with respect to the trimmer head 14 and includes the tube 18 through which the trimmed off blow molding portion is moved as previously described. This tube 18 is generally in alignment with the blow molding to be trimmed so as to facilitate the removal of the trimmed off blow molding portion by the vacuum drawn in the tube from the conduit connected to the vacuum source described above.

As best illustrated in FIGS. 6 and 7, the rotary trimming assembly 16 also includes a knife holder 48 pivotally mounted on the rotary member 46 for rotation therewith and being pivotally removal with respect thereto about a trimming axis T that extends parallel to the central axis A in a spaced relationship thereto. The rotary trimming assembly 16 also includes an annular cam follower 50 that is movable along the central axis A with respect to the rotary member 46 thereof that mounts the knife holder. A cam mechanism 52 best illustrated in FIG. 6 extends between the annular cam follower 50 and the knife holder 48 to pivot the knife holder upon movement of the annular cam follower 50 along the central axis A with respect to the rotary member 46 such that a knife 54 held thereby as illustrated in FIG. 7 trims the portion of the blow molding 12 from the rest of the blow molding.

Figure 3:
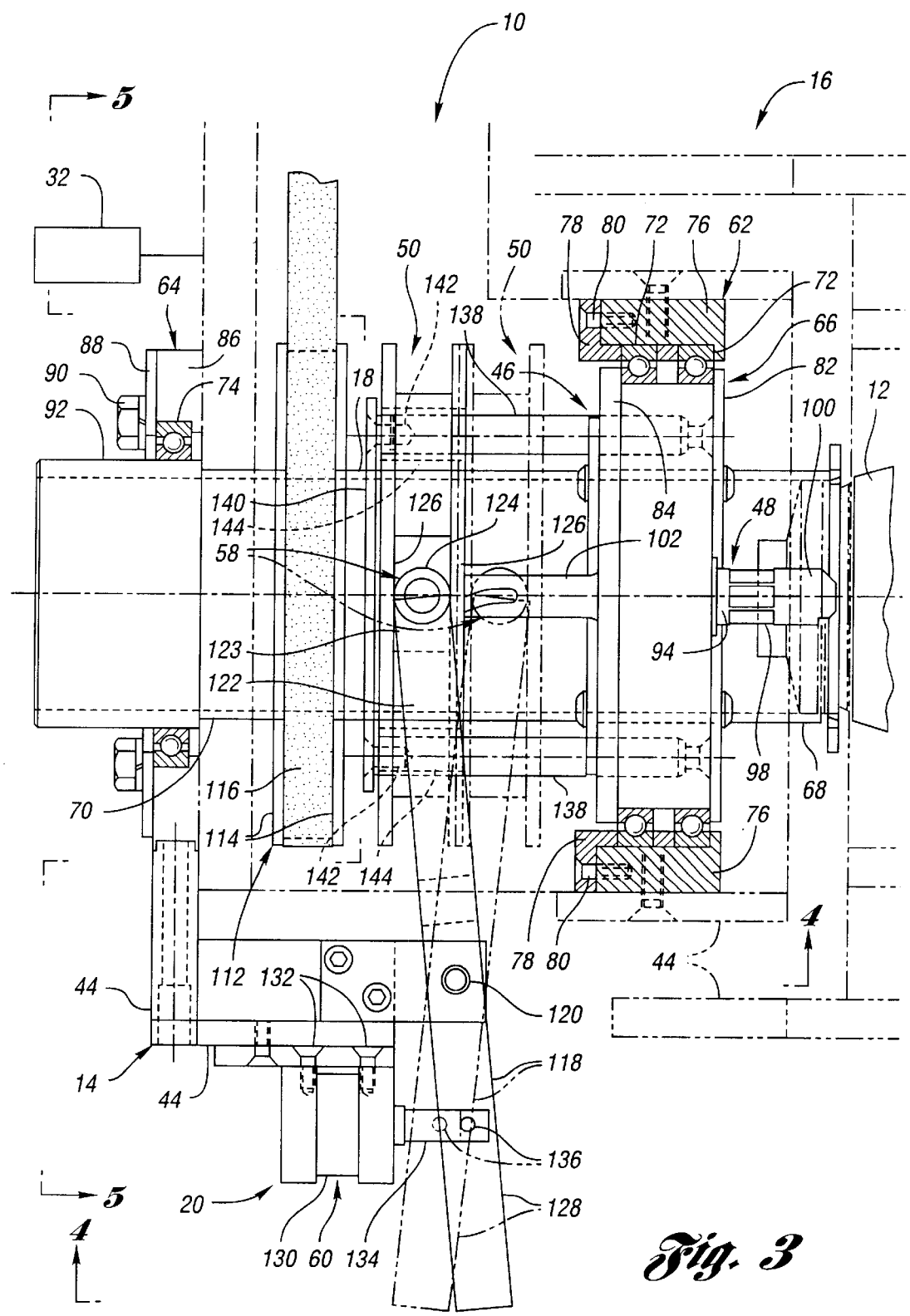
FIG. 3 is a side view of a trimmer head and associated rotary trimming assembly that is mounted on the trimmer head and operable in accordance with the invention to trim a plastic blow molding.

As best illustrated in FIG. 3, the actuating mechanism 20 of the trimming apparatus 10 includes a cam 58 that engages the annular cam follower 50 of the rotary trimming assembly 16 during its rotary driving. The actuating mechanism 20 also includes an actuator 60 that is mounted by the trimmer head 14 and moves the cam 58 of the actuating mechanism to move the annular cam follower of the rotary trimming assembly and pivot the knife holder 48 such that the knife 54 thereof moves from the solid line indicated position of FIG. 7 to its phantom line indicated position to trim the blow molding 12 and thereby allow the trimmed blow molding portion to move through the tube 18 shown in FIG. 6 away from the trimmed blow molding in preparation for the next trimming cycle as previously described in connection with FIG. 1.

With reference to FIG. 6, the trimmer head 14 includes first and second mounting blocks 62 and 64 that are mounted on its construction of fabricated plates and members 44. The rotary member 46 of the rotary trimming assembly 16 includes a ring portion 66 rotatably supported by the first mounting block 62 of the trimmer head for rotation about the central axis A. The tube 18 of the rotary member 46 of the trimming assembly has one end 68 that projects from the ring portion 66 of the rotary member toward the blow molding 12 to be trimmed and the tube has another end 70 rotatably supported by the second mounting block 64 on the trimmer head for the rotation about the central axis A. A pair of antifriction bearings 72 rotatably support the ring portion 66 of the rotary member 46 on the first mounting block 62. An antifriction bearing 74 rotatably supports the end 70 of the tube 18 on the second mounting block 64; however, it should be appreciated that a pair of antifriction bearings may be utilized at this mounting block like with the other one. Furthermore, the first mounting block 62 has a main block member 76 and a retainer block member 78 secured to its main block member by bolts 80 (only one shown) to clamp the outer races of the pair of antifriction bearings 72, while the ring portion 66 of the rotary member 46 has annular flanges 82 and 84 that clamp the inner races of the pair of antifriction bearings 72 in an assembled relationship. Furthermore, the second mounting block 64 includes a main block member 86 and a retainer plate 88 that is secured by bolts 90 to cooperate with the associated main block member and a sleeve 92 of the end 70 of tube 18 to provide the assembled relationship of the antifriction bearing 74 and thereby maintain the rotatable support provided thereby to the tube about the central axis A on the trimmer head.

As illustrated in FIGS. 3 and 6, the tube 18 of the rotary member 46 slidably supports the annular cam follower 50 at a location between the first and second mounting blocks 62 and 64 for movement along the central axis A under the impetus of the cam 58 (FIG. 3) of the actuating mechanism 20 to perform the trimming operation as previously described in connection with the description of the pivoting of the knife holder 48.

As best illustrated in FIG. 6, the rotary trimming assembly 16 actually is illustrated with two of the knife holders 48 in order to provide balancing of the assembly during rotation. Thus, either one of the two knife holders 48 can be utilized at any one time which also provides some versatility in case maintenance is required of one or the other. Each knife holder 48 includes an elongated shaft 94 that extends along the trimming axis T and has an intermediate portion 96 that is pivotally supported on the ring portion 66 of the rotary member 46. The elongated shaft 94 of each knife holder 48 has a first end 98 that projects from the ring portion 66 of the rotary member 46 toward the blow molding 12 to be trimmed and includes a knife holder portion 100 for holding the knife 54 (FIG. 7) for trimming the blow molding. The elongated shaft 94 of each knife holder 48 has a second end 102 that projects from the ring portion 66 of the rotary member 46 toward the annular cam follower 50 and has a slide connection 104 therewith where the cam mechanism 52 of the rotary trimming assembly pivots the elongated shaft 94 of the knife holder upon movement of the annular cam 50 from its solid line indicated position of FIG. 3 to its phantom line indicated position under the impetus of the actuating mechanism 20. More specifically as shown in FIG. 6, each slide connection 104 includes a slide bushing 106 that is mounted on the annular cam follower 50 and receives the second end 102 of the elongated shaft 94 of the knife holder 48 while permitting the movement of the annular cam follower along the direction of the central axis A.

Figure 5:
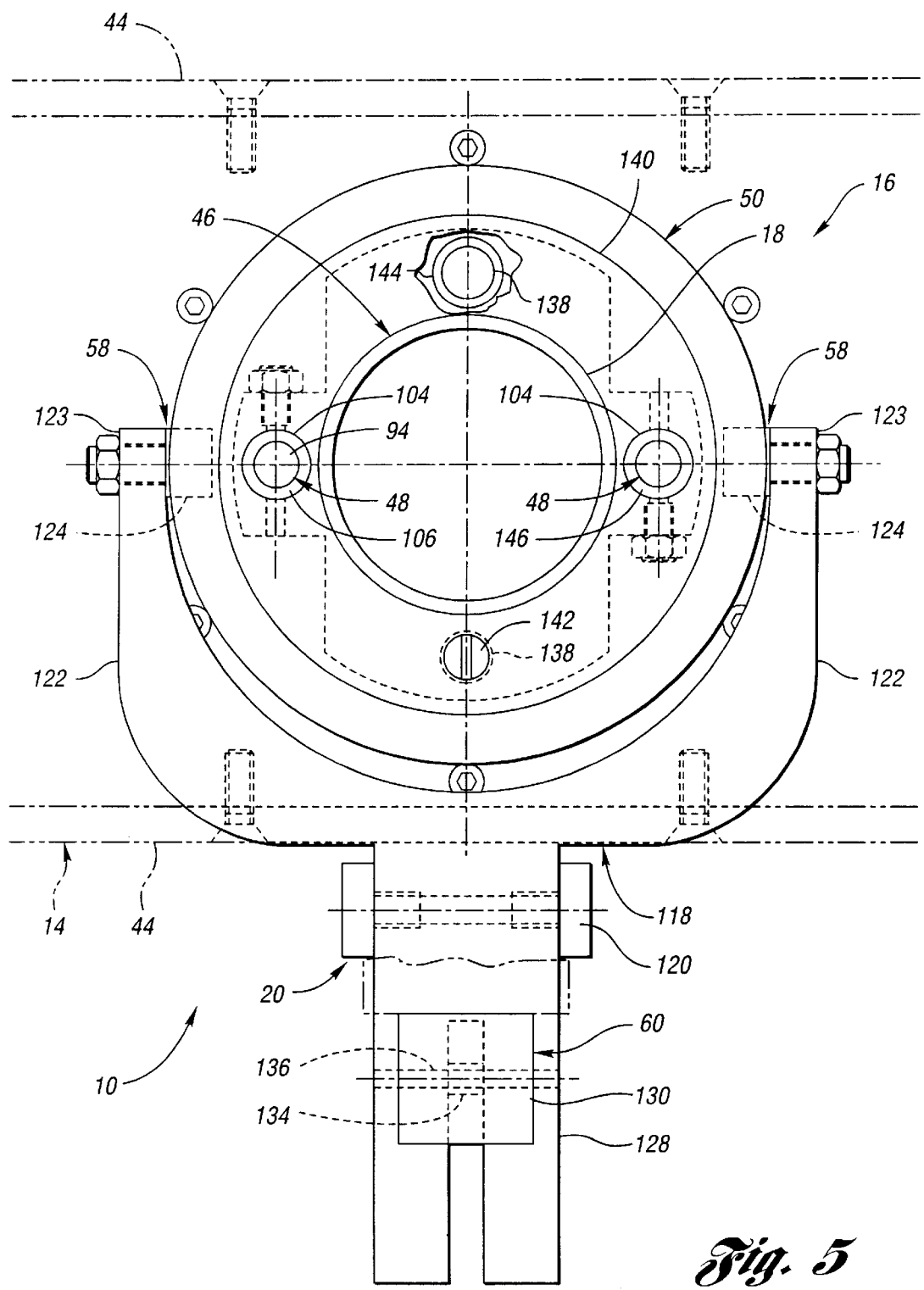
FIG. 5 is an end view of the trimmer head and rotary trimming assembly taken along the direction of line 5—5 in FIG. 3.

With continuing reference to FIG. 6, the cam mechanism 52 of each knife holder 48 includes a cam pin 108 supported on the annular cam follower 50 as is also shown in FIG. 5. A cam follower slot 110 in the second end 102 of the elongated shaft 94 of the knife holder receives the associated cam pin 108 as shown in FIG. 6 such that the axial movement of the annular cam follower 50 under the impetus of the cam actuator previously described pivots the elongated shaft 94 to provide the knife movement illustrated in FIG. 7 for the trimming of the blow molding was also previously described.

As illustrated in FIGS. 3–6, a driven member 112 of the rotary trimming assembly 16 is mounted on the tube 18 of the rotary member 46 to provide rotary driving thereof about the central axis A for the trimming operation. More specifically, this driven member 112 is preferably a belt pulley having side flanges 114 between which a belt 116 is received. The belt 116 is rotatively driven by a suitable electric motor to provide the rotational driving of the tube 18 of rotary member 46 and hence also the rotary driving of the ring portion 66 on which each knife holder 48 is mounted as described above. This belt pulley embodying the driven member 112 is mounted on the tube 18 of the rotary member 46 at a location between the annular cam follower 50 of the rotary trimming assembly 16 and the second mounting block 64 that rotatably mounts the second end 70 of the tube 18 on the trimmer head 14.

Figure 4:
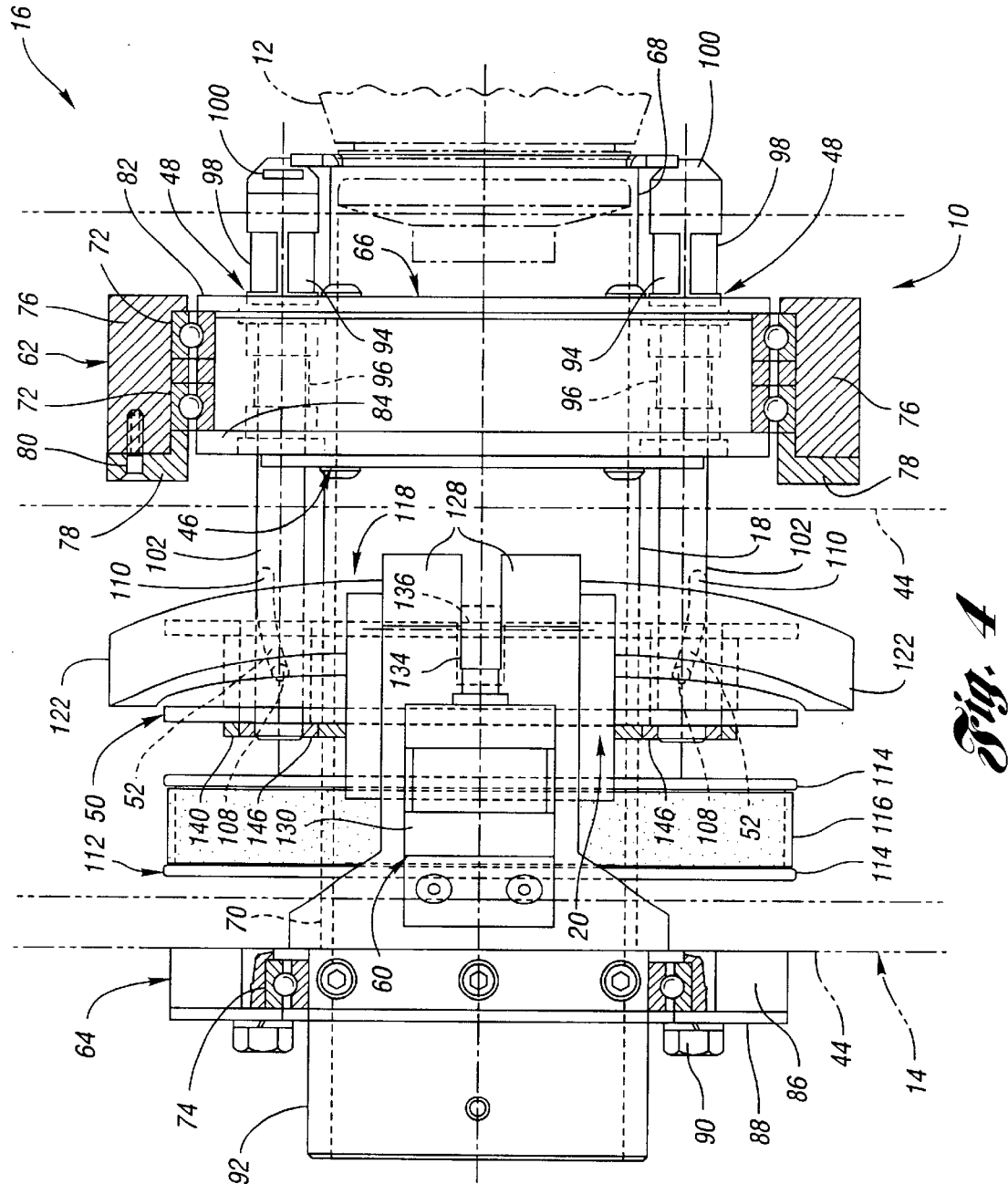
FIG. 4 is a bottom plan view that is taken along the direction of line 4—4 in FIG. 3 to further illustrate the construction of the trimmer head and the rotary trimming assembly.

As illustrated in FIGS. 3, 4 and 5, the actuating mechanism 20 includes a fork 118 pivotally mounted on the trimmer head 14 by a pivotal connection 120. The fork 118 as shown best in FIGS. 4 and 5 includes a pair of arms 122 that extend in one direction from the pivotal connection 120 and have distal ends 123 between which is located the annular cam follower 50 of the rotary trimming assembly 16. The cam 58 of the actuating mechanism 20 includes a pair of cam rollers 124 that are respectively rotatably mounted on the distal ends 123 of the pair of arms 122 of the fork 118. The annular cam follower 50 as best shown in FIGS. 3 and 8 has a pair of annular flanges 126 that are spaced along the central axis A to receive the pair of cam rollers 124 therebetween. The fork 118 of the actuating mechanism 20 also includes a leg 128 that projects from pivotal connection 120 away from the pair of arms 122 and is moved by the actuator 60 of the actuating mechanism 20 to move the cam rollers 124 and the annular cam follower 50 of the rotary trimming assembly 16 to pivot the knife holder and perform the trimming operation as previously described. This actuator 60 as best illustrated in FIG. 3 includes a cylinder 130 that is mounted on the trimmer head 14 by bolts 132 and also includes a piston connecting rod 134 that extends from the cylinder 130 and has a connection 136 to the leg 128 of the fork 118. Compressed air or pressurized hydraulic fluid may be utilized to operate the cylinder 130 in order to move its piston connecting rod 134 and thereby move the fork 118 that provides the cam actuated pivoting of the knife holder that performs the trimming as previously described.

As best shown in FIGS. 3 and 5, the rotary trimming assembly also includes a pair of guideways 138 that have elongated shapes of a shaft like construction with right ends shown in FIG. 3 as being mounted on the ring portion 66 of the rotary member 46 of the trimming assembly. The left ends of these guideways 138 as shown in FIG. 3 mount a support plate 140 which is secured thereto by associated screws 142. Each guideway as shown in FIG. 5 has a slide connection 144 that supports the annular cam follower 50 of the trimming assembly for movement along the central axis. The support plate 140 as shown in FIG. 4 also has bushings 146 that rotatably support the second end 102 of each knife holder shaft 94.

While the best mode for carrying out the invention has been described in detail, conduit familiar with the art to which this invention relates will recognize various alternative designs and embodiments for practicing the invention as defined by the following claims.

What is claimed is:

1. Apparatus for trimming a plastic blow molding comprising:

a trimmer head adjacent which is positioned the blow molding to be trimmed, and the trimmer head including first and second mounting blocks;

a rotary trimming assembly of a generally annular shape and including a rotary member rotatably supported by the trimmer head and rotatably driven about a central axis, the rotary member being axially fixed along the central axis with respect to the trimmer head and including a tube through which the central axis extends with the tube generally in alignment with the blow molding to be trimmed, the rotary member of the rotary trimming assembly including a ring portion rotatably supported by the first mounting block of the trimmer head, the tube of the rotary member of the rotary trimming assembly having one end that projects from the ring portion of the rotary member toward the blow molding to be trimmed, and the tube having another end rotatably supported by the second mounting block, antifriction bearings that rotatably support the ring portion and the tube of the rotary member on the first and second mounting blocks, the rotary trimming assembly also including a knife holder pivotally mounted on the rotary member for rotation therewith and being pivotally movable with respect thereto about a trimming axis that extends parallel to the central axis in a spaced relationship thereto, the rotary trimming assembly including an annular cam follower that is movable along the central axis with respect to the rotary member thereof that mounts the knife holder, and the rotary trimming assembly including a cam mechanism that extends between the annular cam follower and the knife holder to pivot the knife holder upon movement of the annular cam follower along the central axis with respect to the rotary member such that a knife held by the knife holder trims a portion of the blow molding from the rest of the blow molding;

an actuating mechanism including a cam that is mounted by the trimmer head and that engages the annular cam follower of the rotary trimming assembly during the rotary driving thereof, and the actuating mechanism including an actuator that moves the cam thereof to move the annular cam follower of the rotary trimming assembly and pivot the knife holder such that the knife held thereby trims the portion of the blow molding to allow the trimmed blow molding portion to move through the tube away from the trimmed blow molding in preparation for the next trimming cycle;

the tube of the rotary member slidably supporting the annular cam follower at a location between the first and second mounting blocks for movement along the central axis under the impetus of the cam of the actuating mechanism to perform the trimming operation; and the knife holder including an elongated shaft that extends along the trimming axis and has an intermediate portion that is pivotally supported on the ring portion of the rotary member, the elongated shaft of the knife holder having a first end that projects from the ring portion of the rotary member toward the blow molding to be trimmed and includes a knife holder portion that holds the knife for trimming the blow molding, and the elongated shaft of the knife holder having a second end that projects from the ring portion of the rotary member toward the annular cam follower and has a slide connection therewith where the cam mechanism of the rotary trimming assembly pivots the elongated shaft of the knife holder upon movement of the annular cam follower under the impetus of the actuating mechanism.

2. Apparatus for trimming a plastic blow molding as in claim 1 further including an operator for moving the trimmer head toward the blow molding for the trimming operation and back away from the trimmed blow molding in preparation for the next cycle.

3. Apparatus for trimming a plastic blow molding as in claim 1 further including a conduit connected to the tube of the rotary trimming assembly, and a vacuum source for drawing a vacuum in the conduit to move the trimmed blow molding portion through the conduit away from the trimmer head in preparation for the next trimming cycle.

4. Apparatus for trimming a plastic blow molding as in claim 3 wherein the vacuum source includes a blower having an output and a Y coupling having a venturi, and the Y coupling being connected to the conduit and to the output of the blower to draw the vacuum that moves the trimmed blow molding portion through the conduit away from the trimmer head.

5. Apparatus as in claim 1 further including a pair of guideways that extend from the ring portion of the rotary member and have slide connections that support the annular cam follower of the rotary trimming assembly for movement along the central axis, a support plate connected to the pair of guideways, and the support plate having a bushing for rotatably supporting the second end of the knife holder shaft.

6. Apparatus for trimming a plastic blow molding as in claim 1 wherein the cam mechanism of the rotary trimming assembly includes a cam pin supported on the annular cam follower and also includes a cam follower slot that receives the cam pin and is located in the second end of the elongated shaft of the knife holder.

7. Apparatus for trimming a plastic blow molding as in claim 6 further including a driven member mounted on the tube of the rotary member to provide rotary driving thereof for the trimming operation.

8. Apparatus for trimming a plastic blow molding as in claim 7 wherein the driven member comprises a belt pulley mounted on the tube of the rotary member at a location between the annular cam follower of the rotary trimming assembly and the second mounting block that rotatably mounts the second end of the tube on the trimmer head.

9. Apparatus for trimming a plastic blow molding as in claim 1 or 8 wherein the actuating mechanism includes a fork pivotally mounted on the trimmer head, the fork including a pair of arms having distal ends between which is located the annular cam follower of the rotary trimming assembly, the cam of the actuating mechanism including a pair of cam rollers that are respectively rotatably supported on the distal ends of the pair of arms of the fork, the annular cam follower of the trimming assembly having a pair of annular flanges that are spaced along the central axis to receive the pair of cam rollers therebetween, and the fork of the actuating mechanism including a leg that is moved by the actuator to move the cam rollers and the annular cam follower of the rotary trimming assembly to pivot the knife holder and perform the trimming operation.

10. Apparatus for trimming a plastic blow molding comprising:

a trimmer head adjacent which is positioned the blow molding to be trimmed, and the trimmer head including first and second bearing blocks having antifriction bearings;

a rotary trimming assembly of a generally annular shape including a rotary member rotatably supported by the antifriction bearings of the first and second bearing blocks on the trimmer head, the rotary member being axially fixed along a central axis with respect to the trimmer head and including a tube through which the central axis extends with the tube generally in alignment with the blow molding to be trimmed, a driven member mounted on the tube of the rotary member to provide rotary driving of the rotary trimming assembly, the rotary member also including a ring portion from which the tube projects in opposite directions, the rotary trimming assembly also including a knife holder pivotally mounted on the rotary member for rotation therewith and being pivotally movable with respect thereto about a trimming axis that extends parallel to the central axis in a spaced relationship thereto, the knife holder including an elongated shaft that extends along the trimming axis and has an intermediate portion that is pivotally supported on the ring portion of the rotary member, the elongated shaft of the knife holder having a first end that projects from the ring portion of the rotary member toward the blow molding to be trimmed and includes a knife holder portion that holds a knife for trimming the blow molding, the elongated shaft of the knife holder having a second end that projects from the ring portion of the rotary member away from the first end of the elongated shaft of the knife holder, the rotary trimming assembly including an annular cam follower that is movable along the central axis with respect to the rotary member thereof that mounts the knife holder, the annular cam follower having a pair of annular flanges and a slide connection with the second end of the shaft of the knife holder, the rotary trimming assembly including a cam mechanism that extends between the annular cam follower and the second end of the knife holder to pivot the knife holder upon movement of the annular cam follower along the central axis with respect to the rotary member such that the knife held by the knife holder trims a portion of the blow molding from the rest of the blow molding, a pair of guideways that extend from the ring portion of the rotary member and have slide connections that support the annular cam follower of the rotary trimming assembly for movement along the central axis, a support plate connected to the pair of guideways, and the support plate having a bushing for rotatably supporting the second end of the knife holder shaft; and an actuating mechanism including a fork having a pivotal connection for providing pivotal mounting thereof on the trimmer head, the fork including a pair of arms having distal ends between which is located the annular cam follower of the rotary trimming assembly, the actuating mechanism including a cam having a pair of cam rollers that are respectively rotatably supported on the distal ends of the pair of arms of the fork and received between the pair of annular flanges of the annular cam follower, the fork of the actuating mechanism including a leg that projects from the pivot connection away from the pair of arms, and the actuating mechanism including an actuator that moves the leg of the fork to move the cam rollers on the distal ends of the pair of arms of the fork and thereby move the annular cam follower of the rotary trimming assembly to pivot the knife holder such that the knife held thereby trims the portion of the blow molding to allow the trimmed blow molding portion to move through the tube away from the trimmed blow molding in preparation for the next trimming cycle.

11. Apparatus for trimming a plastic blow molding comprising:

a trimmer head adjacent which is positioned the blow molding to be trimmed, and the trimmer head including first and second bearing blocks having antifriction bearings;

a rotary trimming assembly of a generally annular shape including a rotary member rotatably supported by the antifriction bearings of the first and second bearing blocks on the trimmer head, the rotary member being axially fixed along a central axis with respect to the trimmer head and including a tube through which the central axis extends with the tube generally in alignment with the blow molding to be trimmed, a driven member mounted on the tube of the rotary member to provide rotary driving of the rotary trimming assembly, the rotary member also including a ring portion from which the tube projects in opposite directions, the rotary trimming assembly also including a knife holder pivotally mounted on the rotary member for rotation therewith and being pivotally movable with respect thereto about a trimming axis that extends parallel to the central axis in a spaced relationship thereto, the knife holder including an elongated shaft that extends along the trimming axis and has an intermediate portion that is pivotally supported on the ring portion of the rotary member, the elongated shaft of the knife holder having a first end that projects from the ring portion of the rotary member toward the blow molding to be trimmed and includes a knife holder portion that holds a knife for trimming the blow molding, the elongated shaft of the knife holder having a second end that projects from the ring portion of the rotary member away from the first end of the elongated shaft of the knife holder, the rotary trimming assembly including an annular cam follower that is movable along the central axis with respect to the rotary member thereof that mounts the knife holder, the annular cam follower having a pair of annular flanges and a slide connection with the second end of the shaft of the knife holder, the rotary trimming assembly including a cam mechanism that extends between the annular cam follower and the second end of the knife holder to pivot the knife holder upon movement of the annular cam follower along the central axis with respect to the rotary member such that the knife held by the knife holder trims a portion of the blow molding from the rest of the blow molding, a pair of guideways that extend from the ring portion of the rotary member and have slide connections that support the annular cam follower of the rotary trimming assembly for movement along the central axis, a support plate connected to the pair of guideways, and the support plate having a bushing for rotatably supporting the second end of the knife holder shaft;

an actuating mechanism including a fork having a pivotal connection for providing pivotal mounting thereof on the trimmer head, the fork including a pair of arms having distal ends between which is located the annular cam follower of the rotary trimming assembly, the actuating mechanism including a cam having a pair of cam rollers that are respectively rotatably supported on the distal ends of the pair of arms of the fork and received between the pair of annular flanges of the annular cam follower, the fork of the actuating mechanism including a leg that projects from the pivot connection away from the pair of arms, and the actuating mechanism including an actuator that moves the leg of the fork to move the cam rollers on the distal ends of the pair of arms of the fork and thereby move the annular cam follower of the rotary trimming assembly to pivot the knife holder such that the knife held thereby trims the portion of the blow molding to allow the trimmed blow molding portion to move through the tube away from the trimmed blow molding in preparation for the next trimming cycle; and a conduit connected to the tube of the rotary trimming assembly, a vacuum source including a blower having an output, and a Y coupling connected to the conduit and to the output of the blower to draw a vacuum that moves the trimmed blow molding portion through the tube of the rotary trimming assembly and through the conduit away from the trimmer head.

\* \* \* \* \*